US012610057B2

(12) United States Patent
Levi et al.

(10) Patent No.: US 12,610,057 B2
(45) Date of Patent: Apr. 21, 2026

(54) NON-LINEAR RATE-DISTORTION OPTIMIZATION IN VIDEO COMPRESSION PROCESS

(71) Applicant: MELLANOX TECHNOLOGIES, LTD., Yokneam (IL)

(72) Inventors: Dotan David Levi, Kiryat Motzkin (IL); Dror Porat, Haifa (IL); Limor Martin, Givatayim (IL); Eshed Ram, Nofit (IL); Eyal Frishman, Hod Hasharon (IL); Yury Shvartzman, Raanana (IL); Sergey Struzh, Kfar Saba (IL); Ohad Markus, Haifa (IL)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 18 days.

(21) Appl. No.: 18/519,817

(22) Filed: Nov. 27, 2023

(65) Prior Publication Data

US 2025/0175618 A1 May 29, 2025

(51) Int. Cl.

| | |
|---|---|
| *H04N 19/147* | (2014.01) |
| *H04N 19/157* | (2014.01) |
| *H04N 19/172* | (2014.01) |
| *H04N 19/176* | (2014.01) |
| *H04N 19/42* | (2014.01) |
| *H04N 19/30* | (2014.01) |
| *H04N 19/60* | (2014.01) |

(52) U.S. Cl.
CPC ......... *H04N 19/147* (2014.11); *H04N 19/157* (2014.11); *H04N 19/172* (2014.11); *H04N*

*19/176* (2014.11); *H04N 19/42* (2014.11); *H04N 19/30* (2014.11); *H04N 19/60* (2014.11)

(58) Field of Classification Search
None
See application file for complete search history.

(56) References Cited

U.S. PATENT DOCUMENTS

| | | | |
|---|---|---|---|
| 2014/0119432 A1* | 5/2014 | Wang | H04N 19/177 375/240.2 |
| 2021/0203951 A1* | 7/2021 | Kottke | H04N 19/179 |
| 2022/0067417 A1 | 3/2022 | Banerjee et al. | |
| 2022/0086466 A1 | 3/2022 | Holland et al. | |
| 2022/0239944 A1 | 7/2022 | Zhang et al. | |

OTHER PUBLICATIONS

Extended European Search Report issued in European Application No. 24215391.4, dated Apr. 14, 2025.

* cited by examiner

*Primary Examiner* — Samuel D Fereja
(74) *Attorney, Agent, or Firm* — Hogan Lovells US LLP

(57) ABSTRACT

Systems and methods herein are for a video encoder to be associated with a rate optimization distortion (RDO) module and a calibration module, where the RDO module may be to perform RDO for received frames of a media stream and may be to generate at least an RDO output that is based in part on quality measures between the received frames and decoded frames, and where the calibration module may be to provide an evaluation metric that is to scale or transform at least a range of the quality measures, with the scaling or transforming to potentially reduce an effect on a compression performed in the video encoder.

21 Claims, 8 Drawing Sheets

600

GENERATE THE RDO OUTPUT BASED IN PART ON AT LEAST ONE OF UNDERLYING MULTIPLE CURVES FOR BIT RATES AND THE QUALITY MEASURES

602

DETERMINE A SLOPE OF AT LEAST ONE OF THE PLURALITY OF CURVES

604

CHANGE IN THE SLOPE?

606

N

Y

PERFORM THE REDUCTION OF STEP 508 TO REPRESENT, IN PART, THE CHANGE IN SLOPE

608

NON-LINEAR RATE-DISTORTION OPTIMIZATION IN VIDEO COMPRESSION PROCESS

TECHNICAL FIELD

At least one embodiment pertains to a video encoder to perform non-linear rate-distortion optimization in video compression process.

BACKGROUND

Rate-distortion optimization (RDO) may be used to support decision-making pertaining to selection of a mode for coding from different available modes in video encoding, such as in H.264®/AVC® standards. Such modes can offer different distortion reduction or trade-off approaches. The selection of a mode may be performed to address distortion using a rate constraint, for instance. For example, in H.264/AVC video encoding standards, RDO may be provided by allowing selection from intra mode and inter mode but can also extend to selection of a skip mode where each of such modes support different approaches to compression of video data. RDO can be used to determine motion vectors or prediction directions to be used with certain modes, including with inter or intra modes, and can be used to perform aspects of the video encoding. The aspects may include spatial domain transform, quantization, and entropy encoding. From the aspects performed, a selection may be made to perform inter or intra mode coding to handle, wholly, the video encoding requirements, based in part on a minimal rate-distortion cost (RD-cost) for at least a macroblock (MB) of a frame. RDO may be used with other standards as well, including with MPEG2® and MPEG4®. However, even with RDO, such video encoding standards, including AVC, HEVC®, VP9®, AV1®, and VVC®, rely on metrics that may not be well correlated with a subjective perceptual quality.

DETAILED DESCRIPTION

Figure 1:
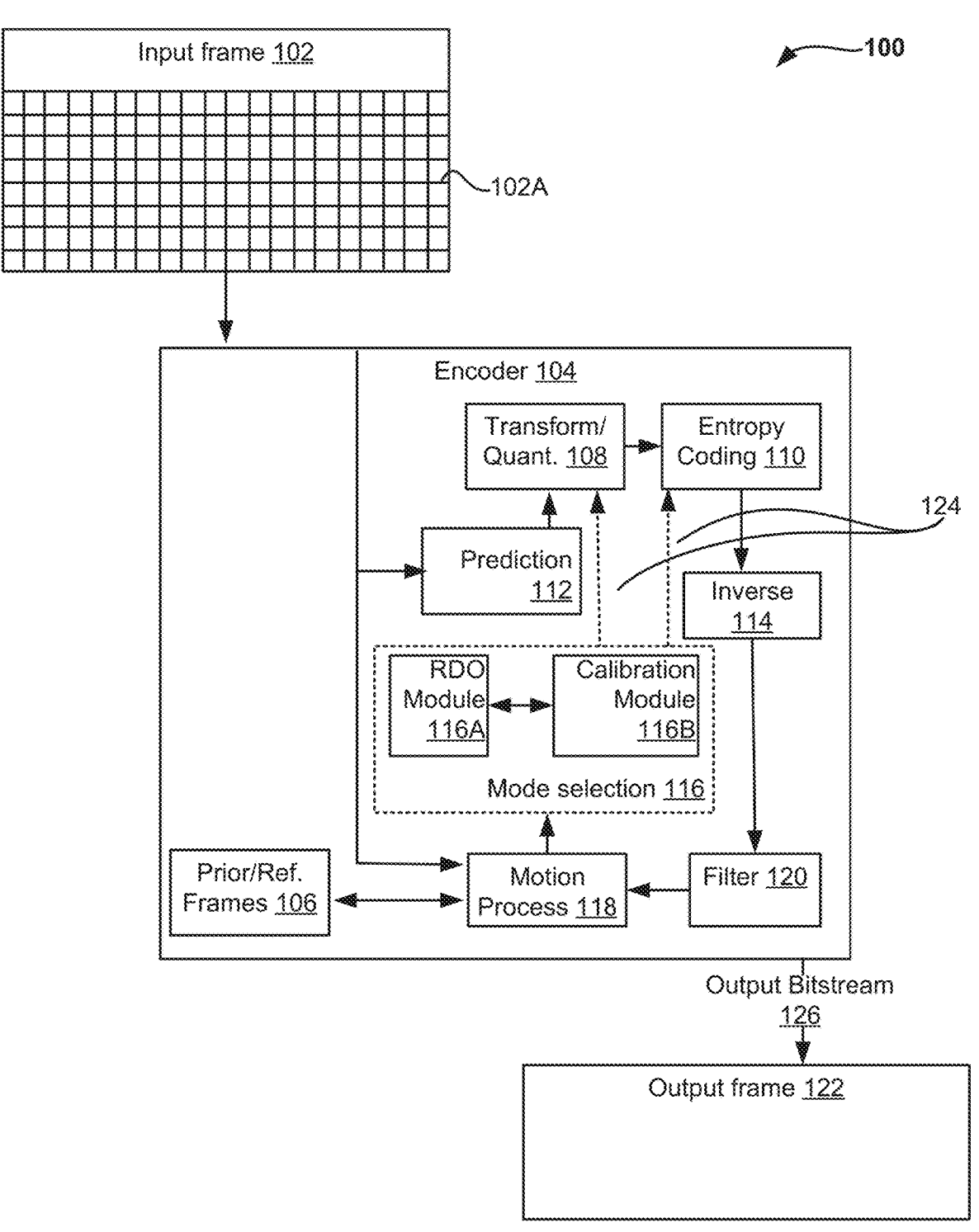
FIG. 1 illustrates a system that is subject to embodiments of non-linear rate-distortion optimization in video compression.

FIG. 1 illustrates a system 100 that is subject to embodiments of non-linear rate-distortion optimization in video compression, as detailed herein. The system 100 includes an encoder 104, such as a video encoder that can receive at least one input frame 102 associated with a video stream, for instance, and that can provide at least an output frame 122 that is a compressed or changed version of the input frame 102. In at least one embodiment, the encoder 104 may be based in part on one of an H.264 standard, an MPEG2 standard, an AVC standard, an HEVC standard, a VP9 standard, an AV1 standard, or a VVC standard. However, the encoder 104 may be any encoder standard that allows weighting input, such as by mode selection using a quantization parameter (QP).

The embodiments herein include the use of one or more circuits of the encoder 104 that can be associated with a rate optimization distortion (RDO) module 116A and a calibration module 116B. For example, the RDO module 116A and the calibration module 116B are part of a mode selection module 116. The RDO module 116A can perform an RDO for received frames of a media stream. The RDO generates at least an RDO output that is based in part on quality measures between the received frames and decoded frames. For example, a quality measure corresponds to a distortion that may be in a decoded frame, relative to a received frame. The RDO output may include RD cost value to enable the encoder to choose a coding option having the least RD cost. The calibration module 116B can provide an evaluation metric that is different from the RDO module 116A and that can provide an evaluation metric that is to scale or transform at least a range of the quality measures associated with the RD cost. In effect, this changes how the encoder chooses the coding option providing a sort of bias that can reduce an effect of a compression performed by the encoder by choosing a different coding option than based solely on the RD cost associated with the RDO output.

In at least one embodiment, the calibration module may be implemented in software, firmware, or hardware, with respect to the RDO module. Therefore, the RDO output that may be part of a mode selection module to select (or enable selection of) a mode, may be hardwired; and further, the calibration module may be hardwired distinctly from the RDO module and also from the mode selection module. The evaluation metric may be provided to a scaling/transforming feature, along with the mode selection module 116, or of the encoder 105. The scaling/transforming feature can scale or transform at least a range of the quality measures that may be associated with the RDO output of the RDO. For example, at least a portion of a block in a frame, subject to compression being performed by an encoder, may have reduced compression as a result of the evaluation metric causing scaling or transforming of at least a range of the quality measures of the block that may be associated with an RD cost of the RDO output.

In at least one embodiment, the scaling or transformation is to reduce an effect of a compression performed in the video encoder. Further, standard curves associated with modes selected using an RDO output can represent the quality measures. Therefore, as used herein, reference to a curve is interchangeable with reference to a measure (or quality measure). Such curves may be associated with a mean square error (MSE), peak signal-to-noise ratio (PSNR), Video Multimethod Assessment Fusion (VMAF), structural similarity (SSIM), or Multiscale SSIM (MS-SSIM) and may have a slope (or steepness) adjusted between points in the frames to reduce a quality impact (of the quality measures) on the compression process. This, in part, represents adjustments in a non-linear RDO process by human-aware intervention provided by the calibration module 116B.

Therefore, the non-linear RDO process herein is also a non-linear human-aware RDO process. As a result of the adjustments in a non-linear RDO process, a range of quality measures that is of higher quality measures (with more steepness) will be adjusted to have less benefit in the compression process than relatively lower quality measures (such as, with less steepness, where the slope or steepness is relative to a predetermined threshold, for instance). The predetermined threshold may be established for standard or similar frames subject to an RDO compression devoid of influence by the calibration module. For example, initial frames in the received frames may undergo RDO compression devoid of influence by the calibration module to establish a threshold followed by RDO compression with the influence of the calibration module to ensure that subsequent frames in the received frames benefit from the quality-preserving aspects of the non-linear RDO process.

As an RDO output enables an encoder to select from several possible bit streams by evaluating their rate and distortion, the range of quality measures corresponds to an amount of distortion allowed. For example, a range of higher quality measures requires or enables lesser distortion, in that range, for higher bits consumed, in a block of a frame subject to compression. The ability to influence the compression, to reduce its effect in certain blocks preserves the quality measures, by scaling or transforming at least a range of the quality measures that is associated with the RDO process so that the RDO causes selection of a bitstream having such reduced effect therein. The processes herein can address, in one instance, misleading quality measures of the RDO process where the RDO output selects a mode that can cause improper compression in regions not requiring high bit rates in a media stream.

Further, in at least one example, curves associated with the RDO output, such as Sum of Squared Errors (SSE) or Sum of Transformed Differences (SATD), may not be as correlated with a subjective perceptual quality, as there may be a trend to add more tools to improve compression. This can harm the use of the quality measures used to predict quality. The quality measures may be associated with a human-aware quality, such as, in reference to a visual quality metric. Further, the quality measures can correspond to an SSE measure, such as peak signal-to-noise ratio (PSNR). Therefore, an approach using only the RDO may result in a poor predictor to a subjective quality assessment. While quality measures have been proposed and implemented, including the aforementioned Video Multimethod Assessment Fusion (VMAF), structural similarity (SSIM), and Multiscale SSIM (MS-SSIM), these quality metrics may be subject to similar issues as in the case of any quality measures that rely on the RDO alone.

In at least one embodiment, processes herein that use the RDO module are improved by the calibration module. The use of the calibration module can address the aforementioned issues and other issues in the use of quality measures associated with an RDO process. The quality measures can enable measurement of a bit rate reduction while maintaining a quality as measured by objective ones of the quality measures. However, this can be misleading as, sometimes, a bit rate reduction may not be properly selected for a determined quality that provides meaningful changes. For example, in a plot of bit rate on an x-axis against a determined quality on a y-axis, representing a quality measure, a slope or steepness may be used to determine quality changes that need certain bit rates for compression. While it may be possible to check ranges of the quality measures that relate to meaningful information to be gained in a video compression process, reflecting such ranges in the RDO may require additional computation.

The RDO output may be used for mode selection in a quality versus bit rate tradeoff for the quality measures and may represent a single number to summarize a difference between these two measures. For example, the RDO output can be used to determine a bit rate at a given quality for a media stream. The RDO output can be misleading as sometimes the bit rate chosen over a predetermined range may be improper to capture a change in quality of a media stream. Further, a steepness or slope of a curve between the two measures can provide information, such as, an increased bit rate for a quality that hardly increases, reflecting a non-interesting area in one or more frames, under processing, for the media stream. When an increasing number of bits in the bit rate does not provide a different enough quality, then there may be no need to increase the number of bits to be part of a video compression process. Therefore, to operate only in the interesting area of a distortion, a curve between the bit rate and quality may not be steep enough. In such instances, a change in an operating point of the curve may be performed, as enabled using the calibration module herein.

In an example, the calibration module with the RDO module enables approximation of the steepness of the curve so as to reduce or to increase bits associated with a bit rate based on changes in quality. As such, if the slope is not a change above a threshold at an operating point, more bits may be invested in other areas of a frame or other areas generally in a video compression process. In at least one embodiment, the calibration module provides an evaluation metric that is to scale or transform at least a range of quality measures to reduce an effect of the compression performed in the video encoder. This may be performed at one or more points or blocks for each frame in the video compression compress.

RDO may be limited to a single point for each block in each frame and may be represented by a linear equation of $R+\lambda*D$, where $\lambda$ (lambda) is a multiplier and where an (R, D) pair may be used with the multiplier to minimize a combined $R+D$ value. R may be associated with a bit rate and D may be associated with distortion as it pertains to quality of the media. The RDO allows ranking, for instance, of candidate solutions using the linear equation to select one of the candidate solutions. Therefore, the lambda value may be associated with a range from 1 till a minimized cost for the set of (R, D). R may be measured in bits and D may be a quality unit, such that the equation provides a measure of units of distortion for every bit of a bit rate used in a video compression process.

To achieve a predetermined bit rate of R, a certain value of lambda may be used. However, this measure provides difference in curves only where the slope is big enough to be noticeable. The calibration module herein enables non-linear RDO because it allows scaling or transforming at least a range of quality measures that were linear. This is performed to reduce an effect of the compression performed in the video encoder. In at least one embodiment, therefore, different from a multiplier that may exist with the RDO module, the calibration module provides a non-linear scaling or transformation that may be in addition to, as well as distinct from, the multiplier. When optimizing an encoder, different quality measures may be used after matching the slope based on all the curves associated with different modes available in an RDO process. In addition, the quality measures may be modified by incorporating the calibration module into the RDO process. In at least one embodiment, the RDO output metric of the RDO is such that selection of a mode is modified by an evaluation metric's effect on the quality measures (such as, by evaluating different slopes of different curves).

In at least one embodiment, the approaches herein enable the use of a single calibration for an evaluation metric that is to scale or transform quality measures associated with a standard RDO and that can remove the need for additional computation. For example, a steepness (or slope) associated with a curve of a quality measure provides information of bit rate versus quality measures, as described herein. The steepness or slope can indicate predetermined increases in interesting areas of a media stream that is less than predetermined increases in non-interesting areas. To remove the issue of misleading information from such predetermined increases, for instance, in a standard RDO, the calibration herein can cause the quality measures to be scaled or transformed to reflect predetermined changes in the frame with respect to a reference frame.

FIG. 1 illustrates that, in aspects of video encoding, a mode selection may be made to perform inter or intra mode coding. Such a mode selection may be performed using a mode selection module 116. The selection may determine, how many bits the encoder is willing to sacrifice in order to conceal and/or eliminate a distortion. The trade-offs associated with distortion may be different between different encoders. For example, the trade-offs may be between different user presets, different target bit rate (such as, possibly affecting a bit budget), and between different frames in a group of frames (GOP) to be encoded. In another example, a trade-off may include a possibility that some distortion occurs, within a frame 102, and that may not be a reference to other frames and so, the distortion may not propagate further in the encoding.

Video compression may require intensive computation workloads with present state-of-the-art compression ratios providing 1/200 to 1/1000 compression but requiring more compute resources to perform such compression. However, with artificial intelligent and machine learning (AI/ML) workloads using large quantities of images and video, autonomous cars generating a large amount of video in each car, applications like smart cities requiring more video data, content created for entertainment requiring higher video resolution and more bit depth, and present-day remote-working video conferencing technologies, it is appreciated that video compression must be performed is more efficient manner. Further, it is appreciated that human eye limitations, along with the use of color space conversion and separation of luma (brightness) and chroma provide aggressive quantized or decimated features that may be limiting in providing quality video compression.

For example, a Fourier or other related transform may be performed on blocks within every frame to convert data therein to a frequency domain and to allow quantization or discarding of information based on select frequencies. In doing so, transform coefficients at lower frequencies may be less aggressively quantized than those of higher frequency. Separately, motion estimation may be used to capture and encode movements across video frames. While all such aspects attempt to improve video compression, they may all serve a similar goal to allow an encoder to compress video into smaller bitstreams by eliminating noise, artifacts, allowing at least more intensive motion estimation and exploiting temporal and spatial redundancy.

In view of all such benefits, encoders may differ based in part on selections of proper tool(s) to enable aspects therein to provide economy of bits, such as, to enable selection of input frames 102 and selection of areas (such as provided by macroblocks (MBs) 102A) within those frames, and other such approaches that may be defined within the encoder as different modes that may require more bits to ensure a desired quality. An RDO module 116A may be provided within a mode selection module 116 of an encoder 104 to address such requirements by the use of RDO metrics, such as Sum of Squared Errors (SSE) or Sum of Transformed Differences (SATD) to determine a cost associated with each selection made and to enable a selection based on the cost. However, such selections may be less correlated with a subjective perceptual quality. For example, there may be modes available with the encoder 104 to add more sophisticated tools of compression, such as a calibration module 116B. Such modes may affect an ability of the RDO metrics to predict a quality that is intended using the selection. In one instance, while a visual quality metric may correspond in the SSE RDO metric using Peak Signal-to-Noise Ratio (PSNR), this may be a poor predictor to the quality assessment.

Further RDO metrics allow further mode selection that benefit from evaluation using further quality measures, including VMAF, SSIM, MS-SSIM, or PSNR. However, addressing temporal effect remains for an encoder 104, as it may be done on only a frame level using such further RDO metrics. Distortion may be determined as a difference from the original image. In some applications, however, it is appreciated that an approximation of the steepness of a quality curve may be performed so as to reduce or to increase bits associated with a bit rate based on changes in quality.

In at least one embodiment, the system 100 for non-linear rate-distortion optimization in video compression includes a calibration module 116B to provide an evaluation metric that is to scale or transform at least a range of quality measures that may be a basis for the mode selection provided by the RDO output of the RDO module 116A. The scaling or transforming of at least the range of quality measures may be used by the encoder 104 to perform the video compression and, in particular, to reduce an effect of the video compression. For example, the encoder 104 (also referred to herein as a video encoder) can receive transform coefficients or parameters, such as QPs. The RDO module 116A operates to optimize, for each point or block of a frame, an efficient representation that may include segmentation, prediction modes, motion vectors (MVs), or the QPs.

In at least one embodiment, use of the RDO output is to make a selection of a mode, as provided by the RDO module 116A. However, the underlying quality measures to enable the RDO output is modified by the calibration module 116B to determine weights to be attached to certain blocks associated with a video frame and to enable weights to those blocks differently than other blocks, in the encoder 104. In effect, the evaluation metric of the calibration module 116B can scale or transform at least a range of the quality measures to cause mode selection in a manner to reduce an effect of a compression performed by the video encoder. In at least one embodiment, an interface may be used to allow receipt input to the calibration module 116B to enable the evaluation metric that can scale or transform at least a range of quality measures of the RDO output. As a result, non-linear RDO can reduce an effect of the compression performed in the video encoder.

In at least one embodiment, the interface and one or more of the RDO module and the calibration module are part of a processor or an execution unit within the processor. Further, the encoder 104 is also part of a same or a different processor or a same or a different execution unit within the processor. In at least one embodiment, the RDO output is associated with different curves for bit rates and quality measures. For example, an RDO output enables selection of a mode that is based in part on a specific bit rate and a specific quality measure intended for at least one block 102A of an input frame 102. Further, the reduction in the effect of the compression performed in the video encoder is enabled in part by analysis of the quality measures, that is modified by an evaluation metric and that may be represented by a change in a slope of at least one of these different curves.

In at least one embodiment, the capabilities of the encoder 104 may be initially provided to any application that intends to use the encoder 104. A block of the input frame 102 subject to weighting may be subject to a further noise estimation algorithm that is one or more of temporal or spatial. This enables different weights to individual blocks afflicted with stronger noise in addition to the weights associated with the weight map. Further, the weights for the weight map can be determined based in part on edges within a frame having the blocks. Still further, the weights for the weight map may be derived from an output of a detection or classification model running on the image to detect or classify aspects within the image, such as objects relative to backgrounds. Even further, the weights for the weight map may be determined based at least in part on evaluation metric changes to the RDO output. In one example, visual quality metrics that may be used to determine the RDO outputs and that may be subject to modification by the evaluation metric. Such visual quality metrics may include Extended Perceptually Weighted PSNR (XPSNR) or Perceptually Weighted PSNR (WPSNR).

In at least one embodiment, information or an output of the interface may be used with the encoder 104 that is made agnostic to the RDO output. The calibration module 116B may provide a map of weights in any execution unit of a processor performing the RDO, which affects the RDO output of the RDO module 116A. This allows a result of the RDO module 116A to select a mode, by the mode selection module 116 as a whole, for video compression that relates to meaningful information to be gained in a video compression process.

In at least one embodiment, with software aspects of an encoder 104 herein, the system 100 and its supported method are also able to perform video compression using the weight map and without sharing information associated with the calibration module. Further, an application programming interface (API) may have a weight map for each type of RDO output, which is to be associated with the calibration module and to be used with the RDO output. A classification for edges, face detection, or other object detection may be also supported to enable different evaluation metrics to be used. The API receives a parameter for a sequence and for the frames of the sequence. A weight map provides weights for one or more blocks 102A for every frame 102 for the video compression to be perform by the encoder 104. As a result, a bitstream from the encoder 104 may be lower in terms of bandwidth. In addition, artificial intelligence (AI) or machine learning (ML) applications can benefit from this approach as the underlying data is not compromised by the non-linear RDO performed herein that maintains quality required for such application.

In at least one embodiment, an RDO module may use any metric that is classic or weighted to provide the RDO output. However, the RDO module may use reference to a previously encoded and reconstructed frame that has been decoded, and that is referenced herein as a decoded frame. In at least one embodiment, a bit rate associated with an RDO may be determined using one or more modes, but may be supported further by MVs and by any frame differences. In at least one embodiment, residuals may be controlled by a step-size scaling to be used for inverse quantization reconstruction of a transformed difference signal, where larger step sizes provide a lower bit rate but also provide more distortion. Further, for a number of bits to transmit such MVs, a version of the input frame with a certain trade-off may be needed.

The trade-off may be controlled by vector quantization, in which each block of an input frame may be encoded and quantized using a respective codebook that may include a neighborhood of blocks of a same size and that is previously decoded frames that are stored. The decoded frames may be determined by a motion process that may include motion estimation for an input video stream having the input frame 102. In one example, the codebook may include motion vectors and the motion estimation may be a minimization of a cost function having the distortion. The distortion may be represented in a prediction error and may be weighed against number of bits associated with the MVs and using a multiplier.

This approach will allow generative AI to be used with the non-linear RDO performed herein. In at least one embodiment, non-linear RDO performed herein can also address bit allocation and smart bit savings by aspects occurring in a rate controller that is part of or supportive to an encoder 104. For example, if a block of a frame is found to be similar to a co-located block of the frame, an energy of a residual is low. Then no matter the quantization performed, there may be no influence by the quantizer and there may be no need to allocate bits for such information as evidenced by the evaluation metric's influence over RDO output to scale or transform at least a range of quality measures of the RDO output, which in turn reduces an effect of the RDO output on compression performed in the video encoder.

In at least one embodiment, non-linear RDO in a video compression processes allows an encoder 104 to provide a final output 124, where the encoder 104 uses at least a weight map related to the output metric 124, such as a related to a mode selected by the final output 124, to weigh different blocks associated with a video frame as part of a mode selection or to perform video compression. In at least one embodiment, the evaluation metric may be received in an interface or in a rate controller aspect of the encoder 104.

The encoder 104 can support an RDO that is performed for at least one frame of the received frames 102 from an application, where a weight map is used to weigh one or more first blocks associated with an individual one of the frames more than one or more second blocks associated with the individual one of the frames. Further, one or more of the features of the RDO module 116A or the calibration module 116B may be performed in hardware (such as individual processors or individual execution units of a processor) so that there is no loss in performance pertaining to the quality of the video. Finally, a media application may be capable of determining that the video encoder has such an ability to perform non-linear RDO before providing the video stream.

The non-linear RDO can address bit allocation and smart bit savings during video compression conducted in blocks of a frame may be performed in a rate controller based on findings within certain blocks. However, to also address blocks that might have similar content to a collated block or object within the block that results in low energy of the residuals, in making such findings and that reduce the effect of quantization performed, the system 100 and its associated method enable RDO to be performed for only blocks of the received frame 102 that are candidates for the RDO as determined by the video encoder 104 or an input to the video encoder. Therefore, applications such as video conferencing, AI/ML, facial recognition, etc., can enable an input to the video encoder of the data subject to compression or processing. A separate application can interface with the video encoder to inform of calibration capabilities for the calibration module of the encoder and the encoder can determine. Therefore, the non-linear RDO can be pertinent to a specific image standard, such as VMAF, SSIM, MS-SSIM, PSNR, etc. The RDO output and the evaluation metric can be the basis of weighting in the RDO for the application's video frames.

In at least one embodiment, FIG. 1 provides an encoder 104 that is subject to H.264 encoding. The encoder 104 includes modules in hardware or software, such as a prediction module 112, a transformation and quantization (T and Q) module 108, and an entropy coding module 110. There may be further modules, such as an inverse module 114, a filter module 120, a motion process module 118 (to support motion estimation and related aspects), and a prior or reference frames module 106. The non-linear RDO herein does not have effect on a decoding process for a bitstream provided from the encoder 104 that includes the output frame 122. For example, the decoding process may be according to the H.264 decoding or other decoding relevant to the encoding format used in the encoder 104 and particularly in the entropy coding module 110.

A bitstream of frames to be compressed may include an input frame 102 that can be subject to segmentation into units of MBs 102A. In at least one embodiment, non-linear RDO can support different sizes of MBs including, but not limited to 8×8, 8×16, 16×8, 4×4, and 16×16. The MBs likely correspond to displayed pixel data obtained at the location of the blocks. The prediction module 112 can generate a prediction MB that can be used to generate residual data reflective of data subject to quantization, as part of the non-linear RDO and for video compression. There may be multiple prediction options associated with a prediction module 112, including intra prediction that is associated with previously encoded data that is from a current frame, such as the input frame 102. Another option associated with a prediction module 112 includes inter prediction that uses encoded data from other previously encoded frames, namely reference frames, such as from the prior or reference frames module 106. These reference frames can appear before or after the current frame, in the display order and may be associated with motion compensation, such as motion process module 118 that uses previously coded frames, such as provided from the prior or reference frames module 106.

Yet another option associated with a prediction module 112 includes the use of different prediction block sizes that is available to both, the intra prediction and inter prediction options. The use of different prediction block sizes of the MBs 102A can change an accuracy associated with the predictions. A further option associated with a prediction module 112 includes the use of multiple frames during prediction, which is available in the inter prediction option to provide better accuracy in the predictions. A still further option is to skip MB data or residual data so that the encoder 104 itself performs an inference of the MB data based in part on the prediction MB.

Intra prediction may be based at least in part on spatial data within an input frame 102, where MBs generated as part of the intra prediction that is distinct from the MBs 102A of the input frame 102. Residual data may be residual MBs generated by a subtraction of the prediction MB, from the current MB. The residual MB can be subject to transformation, quantization, and entropy coding in the provided modules 108, 110 depending on a mode selected by a mode selection module 116 that includes the RDO module 116A to perform the RDO, for instance. Further, in the encoder 104, quantized data may be re-scaled and inverse transformed in the inverse module 114. An output of the inverse module 114 may be filtered and combined with the prediction MB in the prediction module 112. Motion estimation from the motion process module 118 may be included. The result may be a reconstructed MB or decoded frames that is provided to the prior or reference frames module 106 for further predictions.

Figure 2:
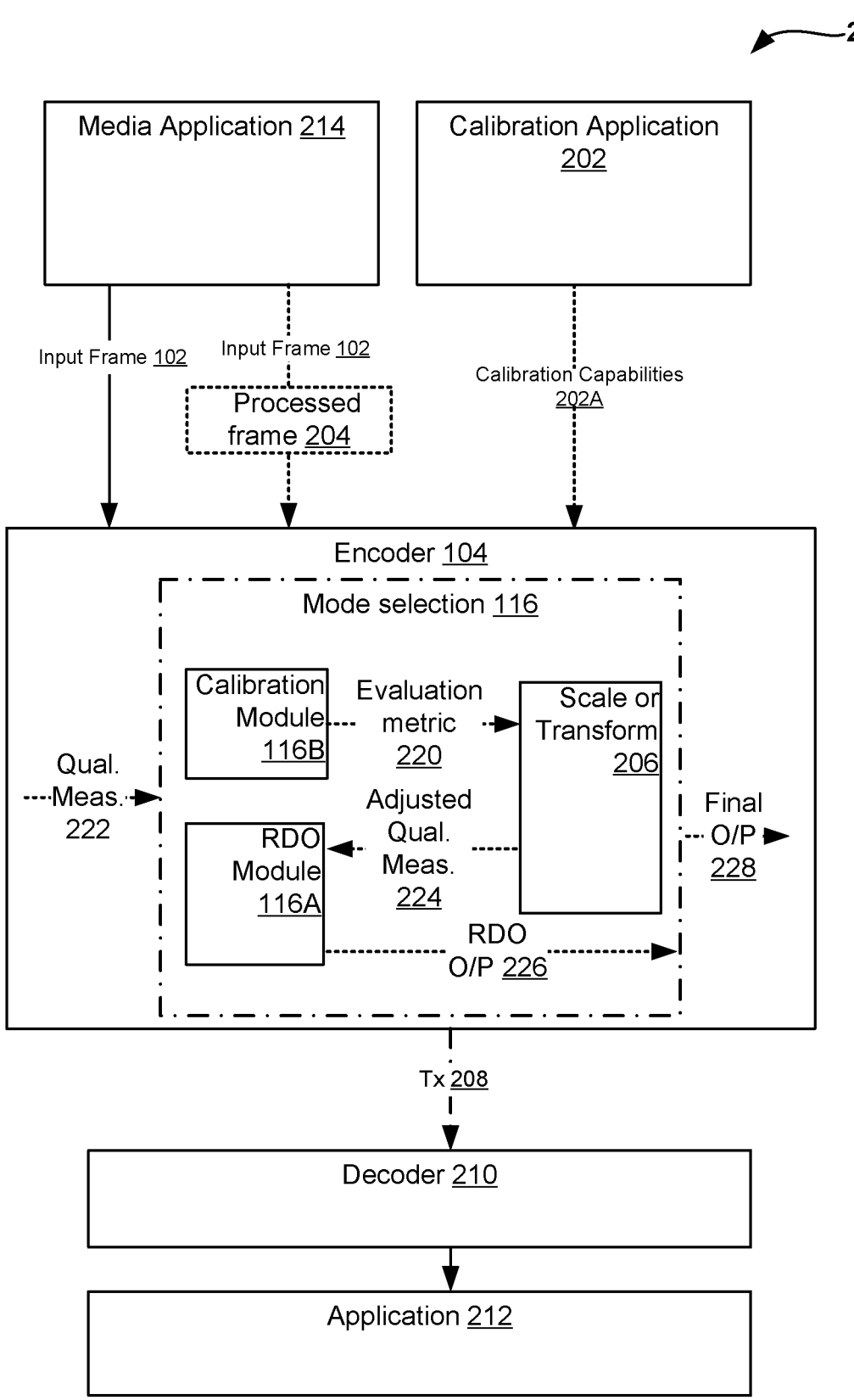
FIG. 2 illustrates aspects of a system associated with non-linear rate-distortion optimization in video compression, according to at least one embodiment.

FIG. 2 illustrates aspects 200 of a system associated with non-linear RDO in video compression, according to at least one embodiment. FIG. 2 describes further details of the specific modules 116, 116A, 116B interfacing within an encoder 104 that is capable of aspects of the non-linear RDO. While certain predication options, as discussed with respect to FIG. 1, are available in the encoder 104 for video compression, one or more of these options may be combined to be part of the modes available for selection using RDO that is modified by a calibration module. Further, other than the prediction module 112 supporting mode selection, the mode selection module 116 allows the encoder 104 to adjust a QP within a mode, such as within an inter mode. In at least one embodiment, a rate controller may be external or within the encoder 104 to provide a QP associated with a rate control for the bitstream generated from the encoder 104. This may be performed to return a compressed video bitstream that provides maximum decoded quality but also that is minimal on the coded bit rate side.

In at least one embodiment, to enable an application 202 to provide input to be associated with the non-linear RDO, abilities of the encoder 104 to support non-linear RDO may be communicated to the application 202 before or after a request by the application 202. For example, an indication may be provided to the application 202 that the encoder 104 can receive a weight map for a calibration module. In another example, the evaluation metric 220 is provided by a calibration application 202 using the interface and this may be irrespective of the encoder's RDO abilities to provide the RDO output, whereas one or more weights that are associated with the RDO module can be processed with the evaluation metric 220 to provide the scaling or transforming 206 of the quality measures 222 to reduce an effect of a compression performed in the encoder 104. Further, an interface to support the calibration module 116B may be performed by software, hardware, firmware, APIs, drivers, or other callable or interface aspects that can be associated with the application 202. Further, a calibration application 202 can interface with the calibration module 116B only provides the capabilities 202A for the calibration module 116B and is different from a media application 214 (such as, a video streaming application) that provides the input frame 102 for video compression.

In at least one embodiment, the weight map may be provided to enable the encoder 104 to use weights therein to change or affect weights otherwise provided with an RDO module 116A. For example, the RDO module 116A may use non-negative weights in the non-linear RDO. These weights (such as, w1 and w2) may be to minimize a linear combination of rate and distortion (R, D set described throughout herein). The weights may be used in at least a transformation and quantization module 108. However, with a calibration module 116A, these weights may be scaled and transformed before the transformation and quantization module 108. For example, using the transformation and quantization module 108, a block of residual data may be transformed using a transformation function. The transformation may be a, in a non-limiting example, 4×4 or 8×8 transformation function that provides coefficients that may be weights in a standard basis pattern. In at least one embodiment, certain codecs may support larger transformation sizes than a 4×4 or 8×8 transformation function. These weights may be modified using the weights from the weight map 302. For example, the coefficients may be quantized such that each coefficient rationed by an integer. The quantization can modify an effect of only some coefficients based in part on a QP, such as the weights from the weight map, instead of across an entire frame.

In an instance, QPs of higher values, as associated with certain weights in the weight map that is adjusted by the evaluation metric, enable modification of some coefficients that are lower values and that are to reduce an effect of a compression performed in the encoder 104 by allowing the RDO output to select a different mode, for instance, than would have otherwise been selected. In at least one embodiment, the reduced effect of a compression may be to allow higher compression in certain areas but to require lower image quality in those areas where steepness of a quality measure indicates that there is not much change in quality in those areas. Further, QPs of a higher value for certain areas in a frame, and as associated with certain weights from a weight map, can enable a modification of some coefficients that may be non-zero to be maintained after quantization. This may provide better image quality with lower compression for certain areas of a frame on the decoded side. Further, the modification in the standard basis patterns can be used to perform an inverse from the residual data.

In at least one embodiment, instead of the input frame 102, a processed frame 204 that may be a downsampled or filtered frame of the input frame 102, may be provided for the encoder 104 to allow for application of weight map associated with an RDO output, from the non-linear RDO, to be used with the input frame. A processed frame 204 may be processed to a color format conversion, in one non-limiting example. In at least one embodiment, weight maps may be generated from at least a retained weight map associated with the encoder 104 by changes to the weights therein based in part on the evaluation metric. Further, the system and method herein support dynamic weighing with the determination of the weight map being dynamically updated for subsequent input frames instead of a singular input frame 102.

In at least one embodiment, the encoder 104 performs no role in the evaluation metric received from the application 202. Further, the evaluation metric may be one that encoder 104 is not familiar with, differently than the RDO's RDO outputs described elsewhere herein that may be associated with such quality measures as PSNR, SSIM, and MS-SSIM. The application 202 can, however, require specific weight to different pixels (or blocks) represented by the MBs 102A. An application may include a manifest file with a key to ensure secure calls may be placed to the interface of the encoder 104, along with the evaluation metrics to be provided for the calibration module 116B and provided for modification of a weight map associated with an RDO module 116A.

In at least one embodiment, the scaling or transforming module 206 may be separate or integrated as part of the calibration module 116B that adjust 224 at least a range of the quality measures to reduce an effect of a compression performed by the video encoder. For example, the adjustment 224 may result in the RDO module providing an RDO output 226 that selects a different mode and it would have otherwise used in a mode selection step for the compression. The encoder 104 is such that the RDO is performed for only blocks of the received frame that are candidates for the RDO as determined by the video encoder or an input to the video encoder. In at least one embodiment, encoder 104 is such that the reduction in the effect on the compression performed by the video encoder represents, in part, a change in a slope of at least one of the plurality of curves.

In at least one embodiment, a system in FIGS. 1 and 2 may include or be comprised in one or more processing units to be associated with an RDO module 116A and a calibration module 116B. For example, as illustrated, these modules 116A, 116B may be within an encoder or associated with an encoder and with a mode selection module 116 of an encoder. The RDO module 116A can perform RDO for received frames 102 of a media stream and to generate at least an RDO output that is based in part on quality measures between the received frames and decoded frames. In addition, the calibration module 116B can provide an evaluation metric that is to scale or transform (or otherwise adjust) at least a range of the quality measures. The end result may be RDO output selects a mode that results in reduction of an effect of a compression performed, in part, by the one or more processing units.

In at least one embodiment, the system in FIGS. 1 and 2 includes one or more one or more processing units to perform a compression that is associated with imaging from an application 214, such as a media application. The compression performed may use input from an RDO module 116A and a calibration module 116B. The RDO module 116A to perform RDO for received frames, such as an input frame 102 in FIG. 1, of a media stream. The RDO module 116A generates at least an RDO output that is based in part on quality measures between the received frames and coded frames, as illustrated in FIG. 3B, with the supporting discussion. In at least one embodiment, the calibration module 116B can provide an evaluation metric that is to scale or transform at least a range of quality measures to reduce an effect of a compression performed by the video encoder.

In at least one embodiment, the encoder 104 may perform a noise estimation algorithm that is one or more of temporal, spatial, or a combination thereof, to provide noise information in addition to the weighting to be performed for an input frame 102. The encoder 104 may determine that the one or more second blocks associated with the individual one of the frames is subject to more noise, in the noise information, than the one or more first blocks associated with the individual one of the frames. The encoder 104 may perform additional weighting of the one or more first blocks and of the one or more second blocks based, at least in part, on the noise.

In at least one embodiment, the weight map that is associated with an RDO output for an RDO module may include weights that are based at least in part on one or more edges within the individual one of the input frames 102 or that are based at least in part on visual quality metrics. Further, the weight map may include weights that are based at least in part on an output of a detection or classification model applied to the individual one of the input frames 102. In addition, the weight map, provided as part of the calibration capabilities, may include weights that are based at least in part on the visual quality metrics that may be associated with at least one RDO output to select one mode for compression of at least one block of the input frame. The output bitstream 126 may be transmitted 208 to a decoder 210 on a receiver-side where it is decoded for an application 212. There need not be any modifications on the decoder 210 to provide the non-linear RDO herein.

Figure 3A:
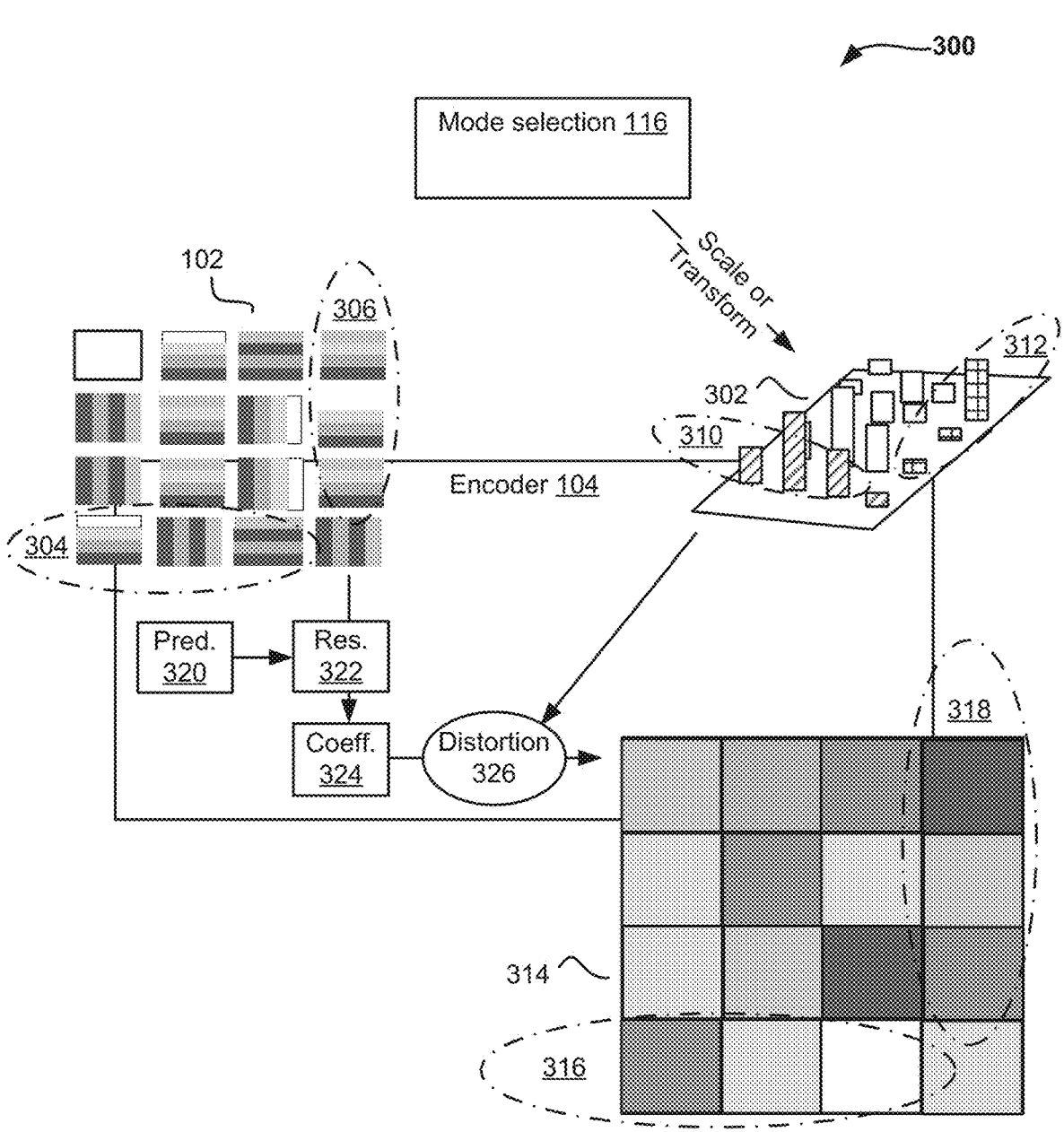
FIG. 3A illustrates further aspects of the system associated with non-linear rate-distortion optimization in video compression, according to at least one embodiment.
Figure 3B:
FIG. 3B illustrates a plot associated with non-linear rate-distortion optimization in video compression, according to at least one embodiment.
Figure 3B:
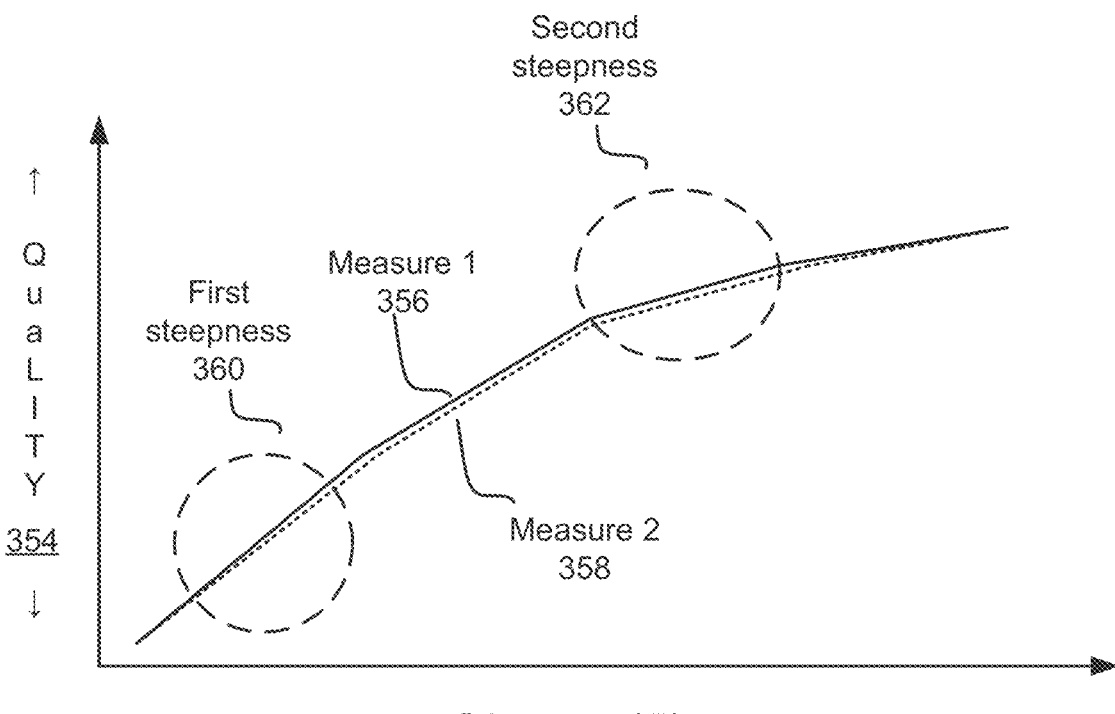

FIG. 3A illustrates further aspects 300 of the system associated with non-linear rate-distortion optimization in video compression, according to at least one embodiment For example, non-linear RDO may be performed in a mode selection module 116 of the encoder 104 and may include cycling through different prediction modes to select a prediction mode to be used for blocks of a frame, the frame themselves, or for multiple frames. As such, for every prediction mode, a prediction block (P) may be generated for a macroblock (MB), residuals are determined, transformation and quantization (T and Q) is performed (including the use of rate control or external influence on the quantization, such as the use of QPs from weight maps), a number of bits associated with coding the residuals is determined, the MB is reconstructed, and a distortion using original and reconstructed MBs are determined along with a cost. Then, based at least in part on the cost for all the modes cycled through, a mode selection is performed to cause at least the prediction and residuals to be used with the entropy-coding of the original frame and at least some subsequent frames, to provide an output bitstream 126, representing an output frame 122 that is a compressed version of the input frame(s), for transmission 208 to the decoder 210.

To influence the RDO process using the non-linear RDO, the system described with one or more of the FIGS. herein includes one or more processing units to enable the RDO to be performed on input frame 102 having MBs 102A, from a media application 214, based in part on a weight map 302 that is associated with at least one RDO output. Further, the weight map 302 may be changed, based in part on the calibration module providing an evaluation metric that is to scale or transform at least a range of the quality measures associated with the weights, to reduce an effect of a compression performed by the video encoder. The weight map 302 may include different weights 310, 312 associated with one or more blocks 304, 306 of the provided MBs 102A an individual one of the input frames 102, and such one or more weights 310, 312 may be subject to changes.

In at least one embodiment, even though the RDO output selects a mode, the underlying basis—such as the quality measures used may be modified by an evaluation metric. While described in reference to the blocks 304, 306 illustrated, the weights may be applied at the T and Q stage and may be applied to cause changes in distortion 326. For example, the coefficients 324 of the transform part of the T and Q stage may include distortion 326 that may be adjusted further by the weights applied from the weight map 302. For example, for each prediction mode 320, the transform outputs the coefficients 324 are weighting values to be associated with a basis pattern, such as provided by an inverse module 114. Once weighted, along with the weights from the weight map 302, the basis patterns can be used to reconstruct the blocks of the residuals 322.

The reconstruction is represented as an image block 314 having weighted basis pattern with different influenced blocks 316, 318 pertaining to the different weights 310, 312 of the weight map 302. For example, the coefficients may be quantized, by a division or other change induced by the weights 310, 312. The quantization changes the coefficients 324 according to the weights 310, 312 providing the QP. In at least one embodiment, the output from the encoder 104 is a compressed bitstream that includes values for the quantized transform coefficients and information for the decoder to recreate the prediction MBs, as well as information for a structure of compression and the frame sequence. These values are converted into binary codes using, for instance, Variable Length Coding (VLC), prior to transmission 208.

In at least one embodiment, the one or more processing units are further to perform a noise estimation algorithm that is one or more of temporal or spatial, or a combination thereof, to provide noise information. A determination can be made that the one or more second blocks 306 associated with the individual one of the input frames 102 is subject to more noise, in the noise information, than the one or more first blocks 304 associated with the individual one of the input frames 102. Further, additional weighting may be performed of the one or more first blocks 304 and of the one or more second blocks 306 based, at least in part, on the noise.

In at least one embodiment, one or more processing units adapted for non-linear RDO are further to determine the weights of the weight map 302 based at least in part on one or more edges within the individual one of the frames or based at least in part on visual quality metrics of the at least one metric. The one or more processing units are further to perform a detection or classification model on the individual one of the frames. Then, the weights determined for the weight map 302 may be based at least in part on an output of the detection or classification models. Therefore, at least one of the weight processes for distortion 326 may perform the detection or classification model to determine aspects of the input frame 102 to be weighed differently based in part on an RDO output that is modified by an evaluation metric. For example, one RDO output that may be associated with quality measures subject to modification by an evaluation metric may also pertain to a sequence to guide the detection or classification model as to specific objects or features to be classified and to enable selection of blocks to be weighed differently as part of the non-linear RDO. Further, the at least one RDO output may be associated with visual quality metrics and the one or more processing units are further to determine the weights based at least in part on visual quality metrics that is modified by an evaluation metric.

FIG. 3B illustrates a plot 350 associated with non-linear rate-distortion optimization (RDO) in video compression, according to at least one embodiment. In at least one embodiment, the encoder 104 is such that the evaluation metric to perform the scaling or transforming changes a slope or steepness 360; 362 that is associated with relationship between bit rates and the quality measures of the RDO output. The plot 350 demonstrates, in part, a tradeoff between bit rate 352 metrics against quality 354 metrics. These metrics 352, 354 may be part of the quality measures underlying an RDO output used for mode selection from an RDO module. As illustrated, a quality 354 measure increases with the bit rate 352 measure or metric. An RDO output 226 or a final output 228 of the system herein may be a single number that can summarize the difference between the quality 354 and the bit rate 352. In at least one embodiment, the RDO output 226 may be initially provided, followed by a final output 228 that is changed subsequently based on the scaling or transforming 206. Although, it is possible that the final output 228 is the RDO output 226. Further, the tradeoff is to determine how much bit rate 352 is required to maintain a given quality 354 measure or how much gain in quality measure can be achieved for a bit rate.

In at least one embodiment, a quality measure may be misleading as, sometimes, the bit rate 352 metric, over the x-axis, may not be effective in determining the quality measure maintained for video compression. While a solution may be to check over which range the curve is meaningful, the non-linear RDO herein takes into account steepness 360; 362 that provides that, if increases to a bit rate occurs, a quality metric that hardly increases suggests non-interesting or non-meaningful areas to consider for using the bits. As such, bit savings may be performed in such areas by allocating bits to other areas where steepness 360; 362 demonstrates that quality is substantially changed with bit rate changes. For example, mode selection to reduce an effect of the compression that is otherwise performed by the RDO module is affected by changing the quality measure using the evaluation metric of the calibration module. Then, the mode selection is different than otherwise it would have been, without the evaluation metric and the calibration module.

Therefore, when increasing number of bits (representing higher bit rate) does not provide a different enough quality, then there is no need for an RDO module to enable a mode selection that increases the number of bits, translating to a mode for compression that may be more lossy. Further, instead of adjusting the mode selection or the compression performed, the evaluation metric may be used to scale or transform at least a range of the quality measures to reduce an effect of a compression performed by the video encoder in areas where higher bit rates offers higher quality. For example, the change or adjustment to the quality measures allows the RDO module to select a different mode for compression that incorporates the reduced effect of a compression performed by the video encoder. In at least one embodiment, as such, the reduced effect of the compression performed in the video encoder is so that the RDO module select a mode for compression to areas demonstrating quality changes with bit rate changes. This is so that quality measures used in the encoder operate only in the interesting area of the distortion, and where the illustrated plot 350 is not steep enough, then a change in an operating point in the curve (such as from the second steepness 362 to a first steepness 360) may be used to incorporate the meaningful areas of the quality measures.

In at least one embodiment, reduction of the effect of the compression is to reduce compression, by a threshold, to at least a portion of a block (such as a set of blocks 306 relative to other blocks 308) in one frame 102 of the received frames. The reduction may be based in part on a mode selection using the RDO output and may use an influence by the evaluation metric in the video encoder. The ability to influence the compression, to reduce its effect in certain blocks 306, preserves the quality measures to those blocks and may be performed, in part, by scaling or transforming at least a range of the quality measures (or the distortion) that is associated with the RDO process so that the RDO causes selection of a bitstream having such reduced effect therein. As such, the threshold is associated with a determined compression enabled by the mode selection and that is devoid of the influence by the evaluation metric. The benefits realized herein may be confirmed by performing an RDO-based compression with and without the calibration module to at least a few received frames to establish and verify the threshold.

In at least one embodiment, as such, non-linear RDO ensures that bits are not spent on areas of image in image or video compression if there is no change in quality by use of such bits. In a manner, this represents slope-sensitive RDO where, when a slope is not big enough (such as, with respect to a predetermined threshold) to represent sufficient quality changes, then an operating point of the non-linear RDO is changed or the bits for RDO may be used in other areas of the image or frame. For example, in the illustrated plot 350, the second steepness 362 is less than the first steepness 360. Therefore, more bits may be spent in an area associated with the first steepness than the second steepness. The allocation of bits may be ensured by the calibration module providing an evaluation metric that is to scale or transform at least a range of quality measures to change an effect of the compression, such as to enable the RDO module to select a mode for compression that has lesser effect that without the calibration module. Ultimately, the reduction in an effect of the compression (such as, in an areas of the first measure 356, with respect to other areas associated with the second measure 358) is enabled in the video encoder.

In at least one embodiment, for every quality measure that may include an objective quality metric, there is a maximum threshold or predetermined range. The maximum threshold is such that, the human eye may not be able to distinguish visible differences or a quality measure value that is above such a threshold or outside such predetermined range. That is, human-aware quality perception may be insignificant. For example, in PSNR, it may not be able to visually distinguish between an image that has PSNR score of 45 to an image with PSNR of 50, where such values are exemplary. On the other hand, there may be a range, in which small changes in a quality measure is highly noticeable or is highly correlated to RDO. For example, in the plot 350, the steepness is more noticeable when the slope or steepness in the curve or quality measure is higher, reflecting higher quality retained under the bitrate used.

In at least one embodiment, therefore, non-linear RDO of the encoder, as described herein ensures that, for every block of an input frame 102 that is candidate to the RDO module, an RDO output may be generated and may be associated with a weighting and calibration (such as, a modification by an evaluation metric that is to scale or transform at least a range of quality measures to reduce an effect of the compression by a mode selection of the RDO output). The evaluation metric may be an absolute value and is such that changes in high quality areas for an image or frame may be given less reward than changes in lower quality areas. In one example, the illustrated plot 350 may be an SSE or other RDO output metric. Further, the non-linear RDO of the encoder ensures that, for every block that is candidate to the RDO module, the RDO output is weighted and calibrated based on the steepness of a respective plot 350 provided for the image or frames at issue.

Figure 4:
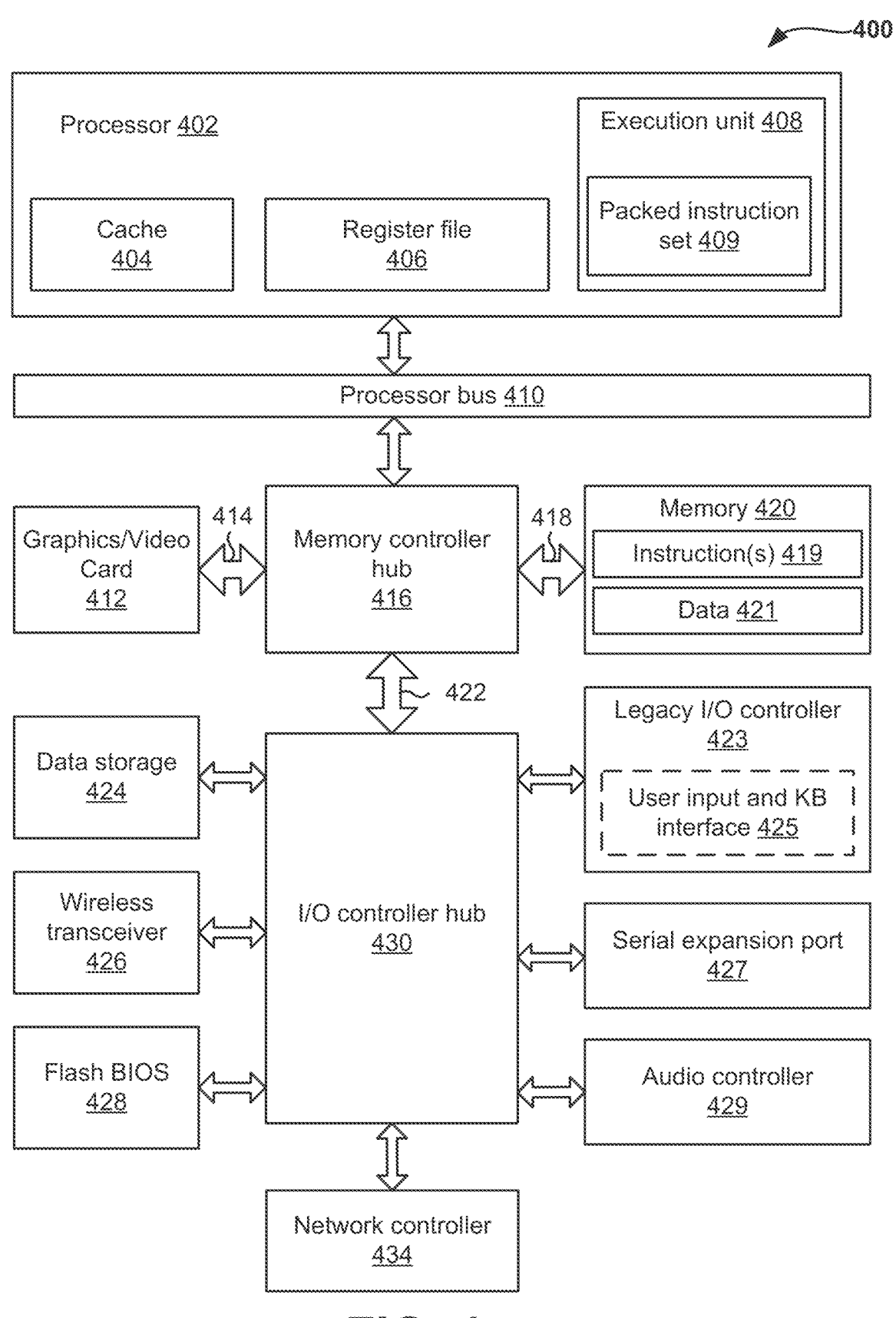
FIG. 4 illustrates computer and processor aspects of a system associated with non-linear rate-distortion optimization in video compression, according to at least one embodiment.

FIG. 4 illustrates computer and processor aspects 400 of a system associated with non-linear rate-distortion optimization in video compression, according to at least one embodiment. For example, one or more processors 402 may include one or more processing or execution units 408 that can perform an application 202 that is associated with the encoder to enable, in part, the calibration module. Further, the one or more processing units 408 can perform aspects of an encoder 104 and of an interface for the encoder with respect to the application 202.

The one or more execution units 408 can incorporate an RDO module and a calibration module, where the RDO module is to perform RDO for received frames of a media stream and to generate at least an RDO output that is based in part on quality measures between the received frames. The calibration module is to provide an evaluation metric that is to scale or transform at least a range of the quality measures to reduce an effect of a compression performed by the video encoder.

In at least one embodiment, the one or more execution units 408 are further to perform a noise estimation algorithm that is one or more of temporal or spatial, or a combination thereof, to provide noise information. The one or more execution units 408 can determine that the one or more second blocks associated with the individual one of the frames is subject to more noise, in the noise information, than the one or more first blocks associated with the individual one of the frames. The one or more execution units 408 can also perform additional weighting of the one or more first blocks and of the one or more second blocks based, at least in part, on the noise.

In at least one embodiment, the one or more execution units 408 are further to determine the weights in the weight map based at least in part on one or more edges within the individual one of the frames or based at least in part on visual quality metrics of the quality measures; but can also determine the weights in the weight map based at least in part on an output of a detection or classification model performed on the individual one of the frames. In at least one embodiment, with at least one of the quality measures including visual quality metrics, the one or more execution units 408 can perform a further determination of the weights in the weight map based at least in part on the visual quality metrics.

The computer and processor aspects 400 may be performed by one or more processors 402 that include a system-on-a-chip (SOC) or some combination thereof formed with a processor that may include execution units to execute an instruction, according to at least one embodiment. In at least one embodiment, the computer and processor aspects 400 may include, without limitation, a component, such as a processor 402 to employ execution units 408 including logic to perform algorithms for process data, in accordance with present disclosure, such as in embodiment described herein. In at least one embodiment, the computer and processor aspects 400 may include processors, such as PENTIUM® Processor family, Xeon™, Itanium®, XScale™ and/or StrongARM™, Intel® Core™, or Intel® Nervana™ microprocessors available from Intel Corporation of Santa Clara, California, although other systems (including PCs having other microprocessors, engineering workstations, set-top boxes and like) may also be used. In at least one embodiment, the computer and processor aspects 400 may execute a version of WINDOWS operating system available from Microsoft Corporation of Redmond, Wash., although other operating systems (UNIX and Linux, for example), embedded software, and/or graphical user interfaces, may also be used.

Embodiments may be used in other devices such as handheld devices and embedded applications. Some examples of handheld devices include cellular phones, Internet Protocol devices, digital cameras, personal digital assistants ("PDAs"), and handheld PCs. In at least one embodiment, embedded applications may include a microcontroller, a digital signal processor ("DSP"), system on a chip, network computers ("NetPCs"), set-top boxes, network hubs, wide area network ("WAN") switches, or any other system that may perform one or more instructions in accordance with at least one embodiment.

In at least one embodiment, the computer and processor aspects 400 may include, without limitation, a processor 402 that may include, without limitation, one or more execution units 408 to perform aspects according to techniques described with respect to at least one or more of FIGS. 1-3B and 5-7 herein. In at least one embodiment, the computer and processor aspects 400 is a single processor desktop or server system, but in another embodiment, the computer and processor aspects 400 may be a multiprocessor system.

In at least one embodiment, the processor 402 may include, without limitation, a complex instruction set computer ("CISC") microprocessor, a reduced instruction set computing ("RISC") microprocessor, a very long instruction word ("VLIW") microprocessor, a processor implementing a combination of instruction sets, or any other processor device, such as a digital signal processor, for example. In at least one embodiment, a processor 402 may be coupled to a processor bus 410 that may transmit data signals between processor 402 and other components in computer and processor aspects 400.

In at least one embodiment, a processor 402 may include, without limitation, a Level 1 ("L1") internal cache memory ("cache") 404. In at least one embodiment, a processor 402 may have a single internal cache or multiple levels of internal cache. In at least one embodiment, cache memory may reside external to a processor 402. Other embodiments may also include a combination of both internal and external caches depending on particular implementation and needs. In at least one embodiment, a register file 406 may store different types of data in various registers including, without limitation, integer registers, floating point registers, status registers, and an instruction pointer register.

In at least one embodiment, an execution unit 408, including, without limitation, logic to perform integer and floating point operations, also resides in a processor 402. In at least one embodiment, a processor 402 may also include a microcode ("ucode") read only memory ("ROM") that stores microcode for certain macro instructions. In at least one embodiment, an execution unit 408 may include logic to handle a packed instruction set 409.

In at least one embodiment, by including a packed instruction set 409 in an instruction set of a general-purpose processor, along with associated circuitry to execute instructions, operations used by many multimedia applications may be performed using packed data in a processor 402. In at least one embodiment, many multimedia applications may be accelerated and executed more efficiently by using a full width of a processor's data bus for performing operations on packed data, which may eliminate a need to transfer smaller units of data across that processor's data bus to perform one or more operations one data element at a time.

In at least one embodiment, an execution unit 408 may also be used in microcontrollers, embedded processors, graphics devices, DSPs, and other types of logic circuits. In at least one embodiment, the computer and processor aspects 400 may include, without limitation, a memory 420. In at least one embodiment, a memory 420 may be a Dynamic Random Access Memory ("DRAM") device, a Static Random Access Memory ("SRAM") device, a flash memory device, or another memory device. In at least one embodiment, a memory 420 may store instruction(s) 419 and/or data 421 represented by data signals that may be executed by a processor 402.

In at least one embodiment, a system logic chip may be coupled to a processor bus 410 and a memory 420. In at least one embodiment, a system logic chip may include, without limitation, a memory controller hub ("MCH") 416, and processor 402 may communicate with MCH 416 via processor bus 410. In at least one embodiment, an MCH 416 may provide a high bandwidth memory path 418 to a memory 420 for instruction and data storage and for storage of graphics commands, data, and textures. In at least one embodiment, an MCH 416 may direct data signals between a processor 402, a memory 420, and other components in the computer and processor aspects 400 and to bridge data signals between a processor bus 410, a memory 420, and a system I/O interface 422. In at least one embodiment, a system logic chip may provide a graphics port for coupling to a graphics controller. In at least one embodiment, an MCH 416 may be coupled to a memory 420 through a high bandwidth memory path 418 and a graphics/video card 412 may be coupled to an MCH 416 through an Accelerated Graphics Port ("AGP") interconnect 414.

In at least one embodiment, the computer and processor aspects 400 may use a system I/O interface 422 as a proprietary hub interface bus to couple an MCH 416 to an I/O controller hub ("ICH") 430. In at least one embodiment, an ICH 430 may provide direct connections to some I/O devices via a local I/O bus. In at least one embodiment, a local I/O bus may include, without limitation, a high-speed I/O bus for connecting peripherals to a memory 420, a chipset, and processor 402. Examples may include, without limitation, an audio controller 429, a firmware hub ("flash BIOS") 428, a wireless transceiver 426, a data storage 424, a legacy I/O controller 423 containing user input and keyboard interfaces 425, a serial expansion port 427, such as a Universal Serial Bus ("USB") port, and a network controller 434. In at least one embodiment, data storage 424 may comprise a hard disk drive, a floppy disk drive, a CD-ROM device, a flash memory device, or other mass storage device.

In at least one embodiment, FIG. 4 illustrates computer and processor aspects 400, which includes interconnected hardware devices or "chips", whereas in other embodiments, FIG. 4 may illustrate an exemplary SoC. In at least one embodiment, devices illustrated in FIG. 4 may be interconnected with proprietary interconnects, standardized interconnects (e.g., PCIe) or some combination thereof. In at least one embodiment, one or more components of the computer and processor aspects 400 that are interconnected using compute express link (CXL) interconnects.

Figure 5:
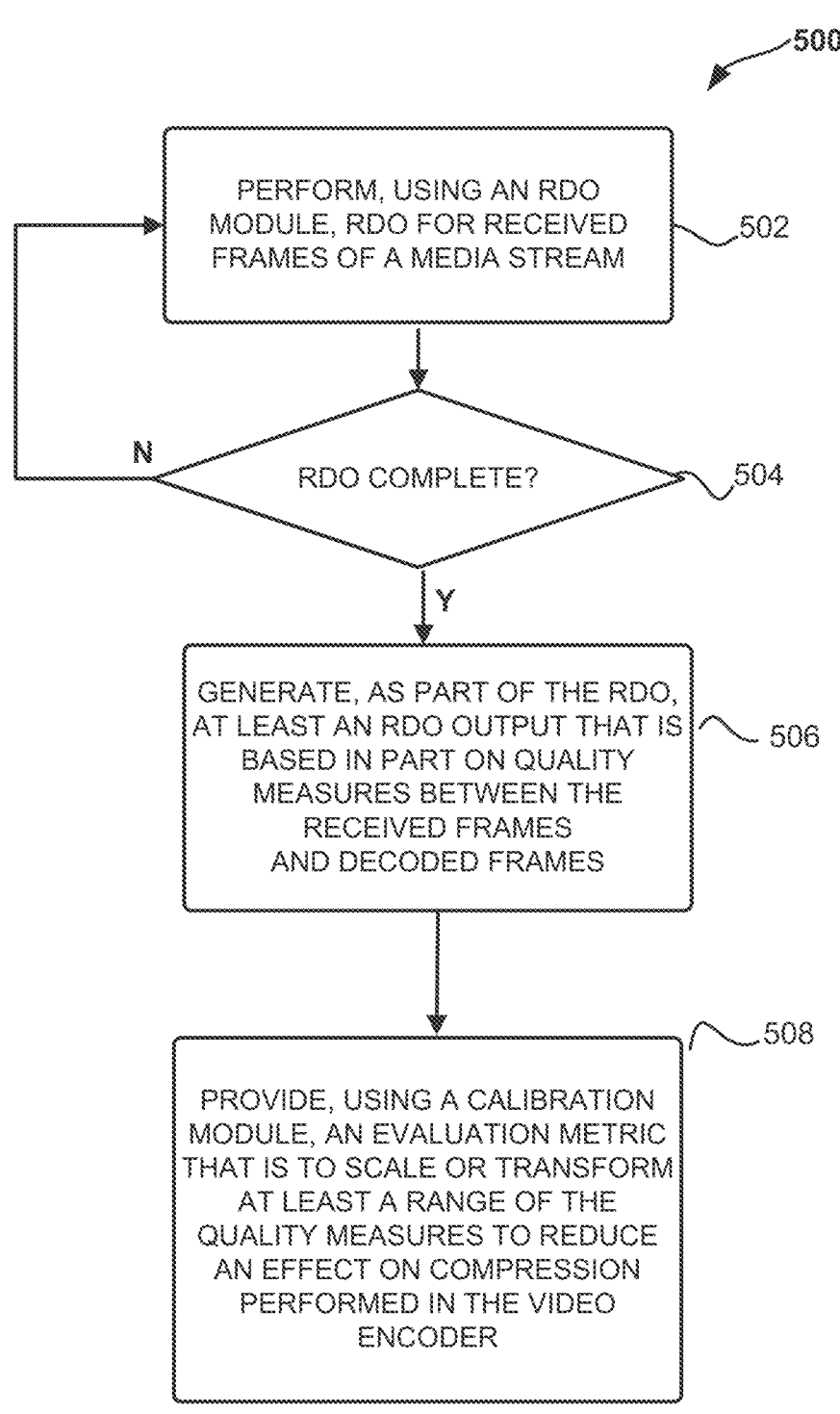
FIG. 5 illustrates a process flow for a system associated with non-linear rate-distortion optimization in video compression, according to at least one embodiment.

FIG. 5 illustrates a process flow or method 500 for a system associated with non-linear rate-distortion optimization in video compression, according to at least one embodiment. The method 500 includes performing 502, using a rate-distortion optimization (RDO) module, RDO for received frames of a media stream. For example, a media application may include a video conferencing application, an AI/ML application, facial recognition application, etc., where each application may require video compression or other stream management. In at least one embodiment, the method 500 includes verifying that an RDO output is provided by ensuring 504 that the RDO is complete.

The method 500 includes generating 506, as part of the RDO, at least an RDO output that is based in part on quality measures between the received frames and decoded frames. Further, the method includes providing 508, using a calibration module, an evaluation metric that is to scale or transform at least a range of quality measures. In one example, this may be enabled by a driver of the encoder or processor communication with a different application or by the use of APIs of an interface to provide calibration capabilities to the encoder. Further, in the providing 508 step of method 500, the result of the evaluation metric is to reduce an effect of a compression performed in the video encoder. For example, the evaluation metric changes the quality measures to enable the RDO module to provide the RDO output that performs a different mode selection than it would have done without the evaluation metric.

In at least one embodiment, it is possible to perform the RDO 502 further to consider those changes to the quality measures from the providing 508 step, and to result in a different mode to be selected for the compression, for instance. Therefore, aspects of the method steps in the method 500 herein may be performed in different order or by cycling through the steps 502-508. In one example, the reduction of the effect of the compression is to reduce compression, by a threshold, to at least a portion of a block in one of the received frames. The reduction may be based in part on a mode selection using the RDO output and using an influence by the evaluation metric in the video encoder. The ability to influence the compression, to reduce its effect in certain blocks preserves the quality measures to those blocks and may be performed, in part, by scaling or transforming at least a range of the quality measures that is associated with the RDO process so that the RDO causes selection of a bitstream having such reduced effect therein. As such, the threshold is associated with a determined compression enabled by the mode selection and that is devoid of the influence by the evaluation metric. The benefits realized herein may be confirmed by performing an RDO-based compression with and without the calibration module to at least a few received frames to establish and verify the threshold.

In at least one embodiment, the reduction may be enabled, in part, by the output metric provided to a transform part of the T and Q stage, described in FIG. 3A, for instance, that may include distortion 326 that may be adjusted further by the weights applied from the weight map 302 associated with the output metric. In at least one embodiment, the RDO output is associated with a plurality of curves for bit rates and the quality measures may include an MSE, a PSNR, a VMAF, an SSIM, or an MS-SSIM. Further, the RDO is performed for only blocks of the received frame that are candidates for the RDO as determined by the video encoder or an input to the video encoder. Still further, the reduction in the effect on the compression performed by the video encoder represents, in part, a change in a slope of at least one of different curves representing different quality measures. In at least one embodiment, the evaluation metric to perform the scaling or transforming changes weights that is associated with the compression to be performed by the video encoder. The compression may be performed using 1H.264, HEVC, or AV1 compression standards.

Figure 6:
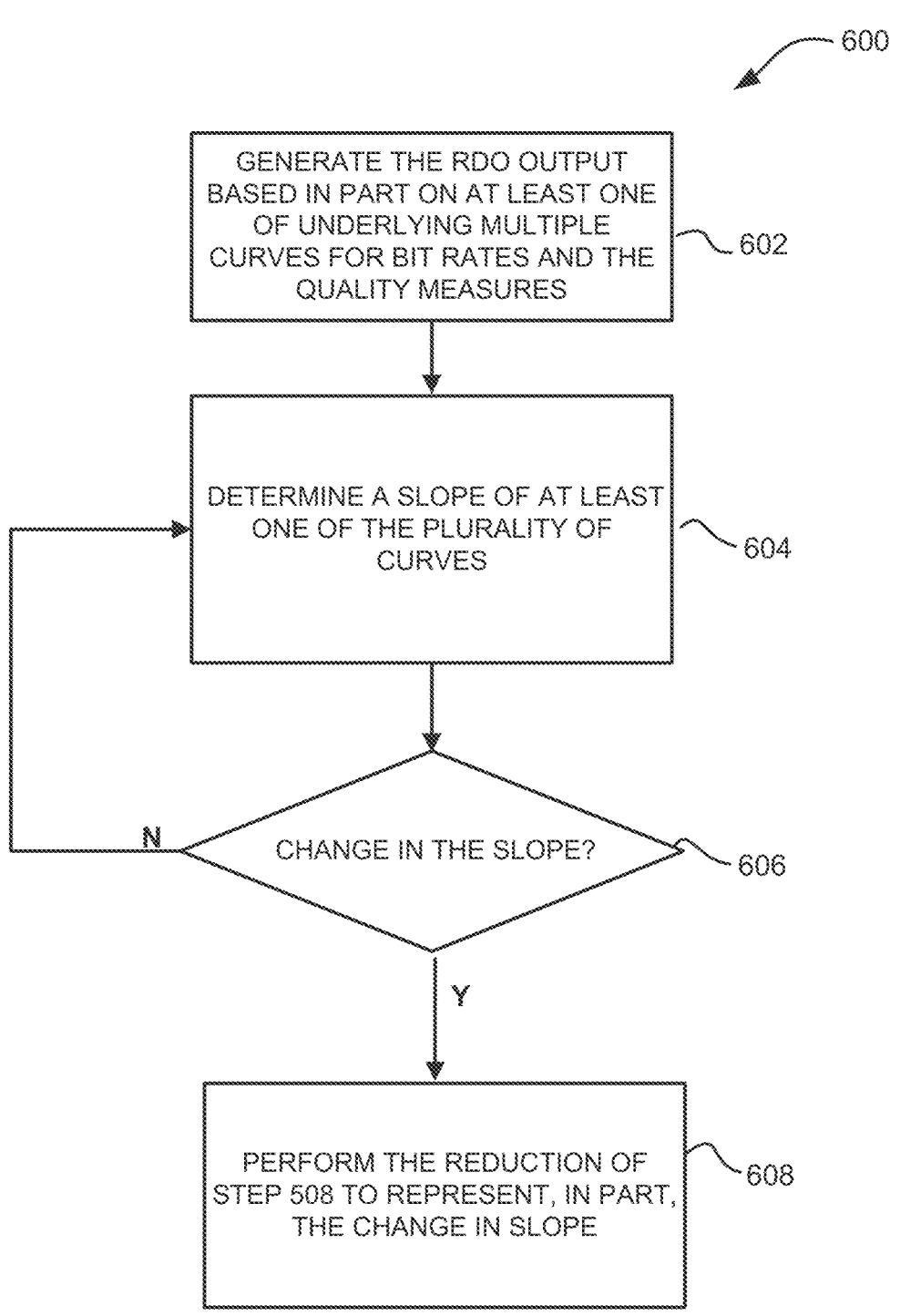
FIG. 6 illustrates yet another process flow for a system associated with non-linear rate-distortion optimization in video compression, according to at least one embodiment.

FIG. 6 illustrates yet another process flow or method 600 for a system associated with non-linear rate-distortion optimization in video compression, according to at least one embodiment. FIG. 6 may support one or more steps of the method 500 in FIG. 5. In at least one embodiment, the method 600 may include a step or a sub-step for generating 602 the RDO output based in part on at least one of underlying multiple curves for bit rates and the quality measures. The method 600 herein may include determining 604 a slope associated with at least one of the curves. A change in slope may be determined 606 as part of the process 600. The method 600 herein includes a performing 608 step the reduction, in the providing 508 step of the method 500 in FIG. 5, in a manner that is enabled in part by a change in a slope of at least one of the curves as determined in the prior step 606. In at least one embodiment, for example, the evaluation metric may be used to change weights that is associated with quality measures so that the RDO output of the RDO module selects a different mode for compression that has lesser effect than without the evaluation metric.

Figure 7:
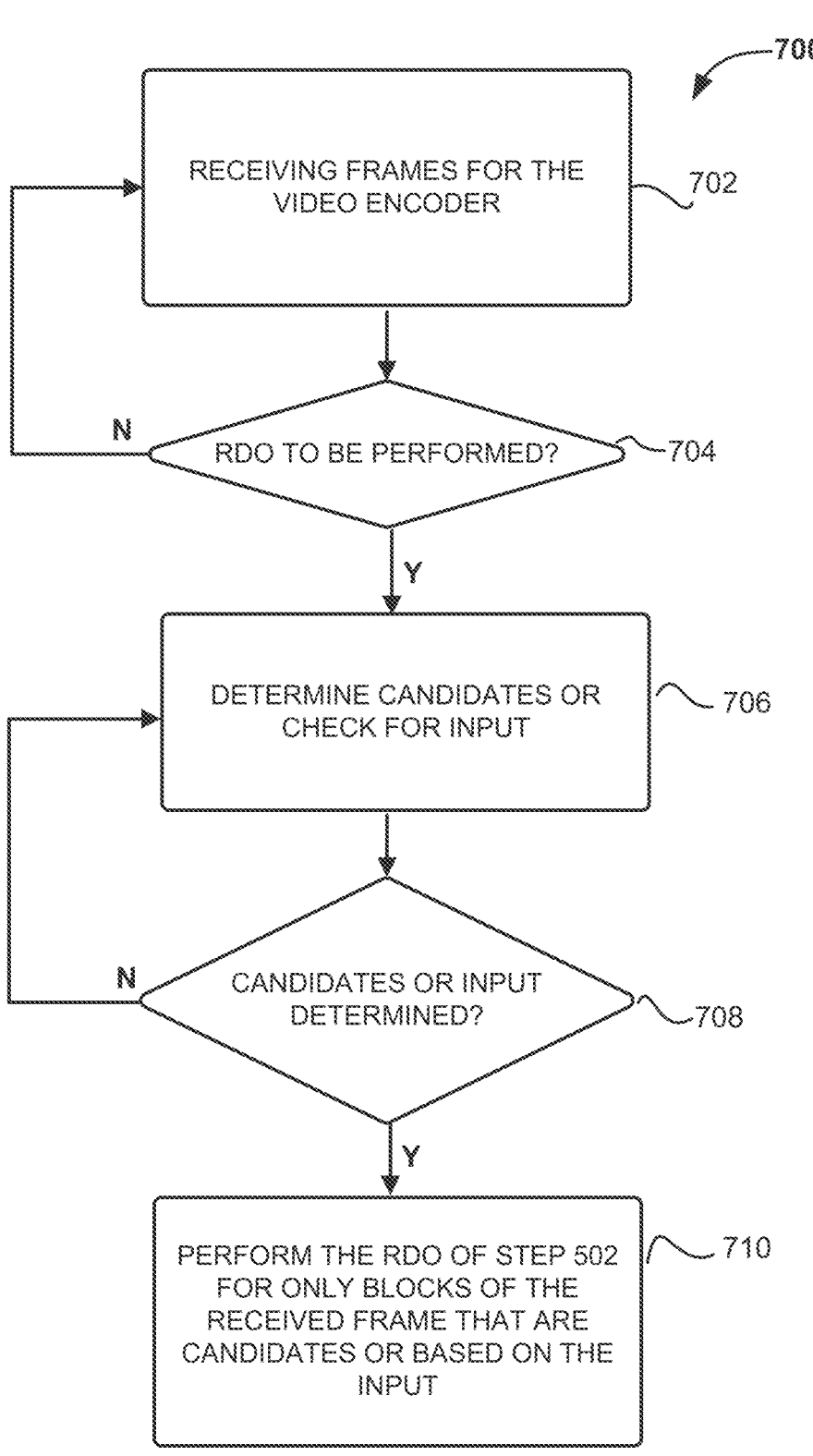
FIG. 7 illustrates a further process flow for a system associated with non-linear rate-distortion optimization in video compression, according to at least one embodiment.

FIG. 7 illustrates yet another process flow or method 700 for a system associated with non-linear rate-distortion optimization in video compression, according to at least one embodiment. FIG. 7 may support one or more steps of the methods 500, 600 in FIGS. 5 and 6. In at least one embodiment, the method 700 may include a step or a sub-step for receiving 702 frames for a video encoder. The method 700 includes verifying 704 that RDO is to be performed. The method 700 includes determining 706 candidates of blocks of a frame to be subject to RDO. A verification 708 may be performed that such blocks for RDO are identified. The method includes performing 710 the RDO for only blocks of the received frame that are candidates for the RDO, as determined by the video encoder or an input to the video encoder.

Other variations are within spirit of present disclosure. Thus, while disclosed techniques are susceptible to various modifications and alternative constructions, certain illustrated embodiments thereof are shown in drawings and have been described above in detail. It should be understood, however, that there is no intention to limit disclosure to specific form or forms disclosed, but on contrary, intention is to cover all modifications, alternative constructions, and equivalents falling within spirit and scope of disclosure, as defined in appended claims.

Use of terms "a" and "an" and "the" and similar referents in context of describing disclosed embodiments (especially in context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. "Connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within range, unless otherwise indicated herein and each separate value is incorporated into specification as if it were individually recited herein. In at least one embodiment, use of term "set" (e.g., "a set of items") or "subset" unless otherwise noted or contradicted by context, is to be construed as a nonempty collection comprising one or more members. Further, unless otherwise noted or contradicted by context, term "subset" of a corresponding set does not necessarily denote a proper subset of corresponding set, but subset and corresponding set may be equal.

Conjunctive language, such as phrases of form "at least one of A, B, and C," or "at least one of A, B and C," unless specifically stated otherwise or otherwise clearly contradicted by context, is otherwise understood with context as used in general to present that an item, term, etc., may be either A or B or C, or any nonempty subset of set of A and B and C. For instance, in illustrative example of a set having three members, conjunctive phrases "at least one of A, B, and C" and "at least one of A, B and C" refer to any of following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, term "plurality" indicates a state of being plural (e.g., "a plurality of items" indicates multiple items). In at least one embodiment, number of items in a plurality is at least two, but can be more when so indicated either explicitly or by context. Further, unless stated otherwise or otherwise clear from context, phrase "based on" means "based at least in part on" and not "based solely on."

Operations of processes described herein can be performed in any suitable order unless otherwise indicated herein or otherwise clearly contradicted by context. In at least one embodiment, a process such as those processes described herein (or variations and/or combinations thereof) is performed under control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium, for example, in form of a computer program comprising a plurality of instructions executable by one or more processors.

In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause computer system to perform operations described herein. In at least one embodiment, set of non-transitory computer-readable storage media comprises multiple non-transitory computer-readable storage media and one or more of individual non-transitory storage media of multiple non-transitory computer-readable storage media lack all of code while multiple non-transitory computer-readable storage media collectively store all of code. In at least one embodiment, executable instructions are executed such that different instructions are executed by different processors for example, a non-transitory computer-readable storage medium store some instructions and a main central processing unit ("CPU") executes some of instructions while a graphics processing unit ("GPU") executes other instructions. In at least one embodiment, different components of a computer system have separate processors and different processors execute different subsets of instructions.

In at least one embodiment, an arithmetic logic unit is a set of combinational logic circuitry that takes one or more inputs to produce a result. In at least one embodiment, an arithmetic logic unit is used by a processor to implement mathematical operation such as addition, subtraction, or multiplication. In at least one embodiment, an arithmetic logic unit is used to implement logical operations such as logical AND/OR or XOR. In at least one embodiment, an arithmetic logic unit is stateless, and made from physical switching components such as semiconductor transistors arranged to form logical gates. In at least one embodiment, an arithmetic logic unit may operate internally as a stateful logic circuit with an associated clock. In at least one embodiment, an arithmetic logic unit may be constructed as an asynchronous logic circuit with an internal state not maintained in an associated register set. In at least one embodiment, an arithmetic logic unit is used by a processor to combine operands stored in one or more registers of the processor and produce an output that can be stored by the processor in another register or a memory location.

In at least one embodiment, as a result of processing an instruction retrieved by the processor, the processor presents one or more inputs or operands to an arithmetic logic unit, causing the arithmetic logic unit to produce a result based at least in part on an instruction code provided to inputs of the arithmetic logic unit. In at least one embodiment, the instruction codes provided by the processor to the ALU are based at least in part on the instruction executed by the processor. In at least one embodiment combinational logic in the ALU processes the inputs and produces an output which is placed on a bus within the processor. In at least one embodiment, the processor selects a destination register, memory location, output device, or output storage location on the output bus so that clocking the processor causes the results produced by the ALU to be sent to the desired location.

Accordingly, in at least one embodiment, computer systems are configured to implement one or more services that singly or collectively perform operations of processes described herein and such computer systems are configured with applicable hardware and/or software that allow performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples, or exemplary language (e.g., "such as") provided herein, is intended merely to better illuminate embodiments of disclosure and does not pose a limitation on scope of disclosure unless otherwise claimed. No language in specification should be construed as indicating any non-claimed element as essential to practice of disclosure.

In description and claims, terms "coupled" and "connected," along with their derivatives, may be used. It should be understood that these terms may be not intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as "processing," "computing," "calculating," "determining," or like, refer to action and/or processes of a computer or computing system, or similar electronic computing device, that manipulate and/or transform data represented as physical, such as electronic, quantities within computing system's registers and/or memories into other data similarly represented as physical quantities within computing system's memories, registers or other such information storage, transmission or display devices.

In a similar manner, term "processor" may refer to any device or portion of a device that processes electronic data from registers and/or memory and transform that electronic data into other electronic data that may be stored in registers and/or memory. As non-limiting examples, "processor" may be a CPU or a GPU. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. In at least one embodiment, terms "system" and "method" are used herein interchangeably insofar as system may embody one or more methods and methods may be considered a system.

In present document, references may be made to obtaining, acquiring, receiving, or inputting analog or digital data into a subsystem, computer system, or computer-implemented machine. In at least one embodiment, process of obtaining, acquiring, receiving, or inputting analog and digital data can be accomplished in a variety of ways such as by receiving data as a parameter of a function call or a call to an application programming interface. In at least one embodiment, processes of obtaining, acquiring, receiving, or inputting analog or digital data can be accomplished by transferring data via a serial or parallel interface. In at least one embodiment, processes of obtaining, acquiring, receiving, or inputting analog or digital data can be accomplished by transferring data via a computer network from providing entity to acquiring entity. References may also be made to providing, outputting, transmitting, sending, or presenting analog or digital data. In at least one embodiment, processes of providing, outputting, transmitting, sending, or presenting analog or digital data can be accomplished by transferring data as an input or output parameter of a function call, a parameter of an application programming interface or interprocess communication mechanism.

Although descriptions herein set forth example implementations of described techniques, other architectures may be used to implement described functionality, and are intended to be within scope of this disclosure. Furthermore, although specific distributions of responsibilities may be defined above for purposes of description, various functions and responsibilities might be distributed and divided in different ways, depending on circumstances.

Furthermore, although subject matter has been described in language specific to structural features and/or methodological acts, it is to be understood that subject matter claimed in appended claims is not necessarily limited to specific features or acts described. Rather, specific features and acts are disclosed as exemplary forms of implementing the claims.

What is claimed is:

1. A video encoder to be associated with a rate distortion optimization (RDO) module and a calibration module, the RDO module to perform RDO for received frames of a media stream and to generate at least an RDO output that is based in part on a function representing a relationship between bit rates and quality measures between the received frames and decoded frames, and the calibration module to provide an evaluation metric that is to scale or transform at least a range of the quality measures based on at least a slope of the function, the scaling or transforming to reduce an effect of a compression to one or more blocks in at least one of the received frames, wherein the effect of the compression is reduced by an amount that is based on at least a mode selection and is independent of the evaluation metric.

2. The video encoder of claim 1, wherein the RDO output is associated with a plurality of curves for bit rates and wherein the quality measures comprise at least one of: a mean square error (MSE), peak signal-to-noise ratio (PSNR), Video Multimethod Assessment Fusion (VMAF), structural similarity (SSIM), or Multiscale SSIM (MS-SSIM).

3. The video encoder of claim 1, wherein the RDO is performed for only blocks of the received frame that are candidates for the RDO as determined by the video encoder or an input to the video encoder.

4. The video encoder of claim 2, wherein the reducing of the effect on the compression performed by the video encoder represents, in part, a change in a slope of at least one of the plurality of curves.

5. The video encoder of claim 1, wherein the evaluation metric to perform the scaling or transforming changes weights that is associated with the compression to be performed by the video encoder.

6. The video encoder of claim 1, wherein the compression is performed using H.264®, HEVC®, or AV1® compression standards.

7. A system comprising:

one or more processing units to be associated with a rate optimization distortion (RDO) module and a calibration module, the RDO module to perform RDO for received frames of a media stream and to generate at least an RDO output that is based in part on a function representing a relationship between bit rates and quality measures between the received frames and decoded frames, and the calibration module to provide an evaluation metric that is to scale or transform at least a range of the quality measures based on at least a slope of the function, the scaling or transforming to reduce an effect of a compression to one or more blocks in at least one of the received frames, wherein the effect of the compression is reduced by an amount that is based on at least a mode selection and is independent of the evaluation metric.

8. The system of claim 7, wherein the RDO output is associated with a plurality of curves for bit rates and wherein the quality measures comprises at least one of a mean square error (MSE), peak signal-to-noise ratio (PSNR), Video Multimethod Assessment Fusion (VMAF), structural similarity (SSIM), or Multiscale SSIM (MS-SSIM).

9. The system of claim 7, wherein the RDO is performed for only blocks of the received frame that are candidates for the RDO as determined by a video encoder or an input to the video encoder.

10. The system of claim 8, wherein the reducing of the effect on the compression, in part, a change in a slope of at least one of the plurality of curves.

11. The system of claim 7, wherein the evaluation metric to perform the scaling or transforming changes weights that is associated with the compression.

12. A system comprising:

one or more processing units to perform a compression that is associated with imaging using input from a rate optimization distortion (RDO) module and a calibration module, the RDO module to perform RDO for received frames of a media stream and to generate at least an RDO output that is based in part on a function representing a relationship between bit rates and quality measures between the received frames and decoded frames, and the calibration module to provide an evaluation metric that is to scale or transform at least a range of the quality measures based on at least a slope of the function, the scaling or transforming to reduce an effect of the compression to one or more blocks in at least one of the received frames, wherein the effect of the compression is reduced by an amount that is based on at least a mode selection and is independent of the evaluation metric.

13. The system of claim 12, wherein the RDO output is associated with a plurality of curves for bit rates and wherein the quality measures comprises at least one of a mean square error (MSE), peak signal-to-noise ratio (PSNR), Video Multimethod Assessment Fusion (VMAF), structural similarity (SSIM), or Multiscale SSIM (MS-SSIM).

14. The system of claim 12, wherein the RDO is performed for only blocks of the received frame that are candidates for the RDO as determined by a video encoder or an input to the video encoder.

15. The system of claim 13, wherein the reducing in the effect on the compression represents, in part, a change in a slope of at least one of the plurality of curves.

16. The system of claim 12, wherein the evaluation metric, to perform the scaling or transforming, changes weights that is associated with the compression performed, in part, by the one or more processing units.

17. A method for a video encoder, comprising:

performing, using a rate-distortion optimization (RDO) module, RDO for received frames of a media stream;

generating, as part of the RDO, at least an RDO output that is based in part on a function representing a relationship between bit rates and quality measures between the received frames and decoded frames; and providing, using a calibration module, an evaluation metric that is to scale or transform at least a range of the quality measures based on at least a slope of the function, the scaling or transforming to reduce an effect of a compression to one or more blocks in at least one of the received frames, wherein the effect of the compression is reduced by an amount that is based on at least a mode selection and is independent of the evaluation metric.

18. The method of claim 17, wherein the RDO output is associated with a plurality of curves for bit rates and the quality measures comprises a mean square error (MSE), peak signal-to-noise ratio (PSNR), Video Multimethod Assessment Fusion (VMAF), structural similarity (SSIM), or Multiscale SSIM (MS-SSIM).

19. The method of claim 17, wherein the RDO is performed for only blocks of the received frame that are candidates for the RDO as determined by the video encoder or an input to the video encoder.

20. The method of claim 18, wherein the reducing in the effect on the compression performed by the video encoder represents, in part, a change in a slope of at least one of the plurality of curves.

21. The method of claim 17, further comprising:

changing, using the evaluation metric, weights that is associated with the compression to be performed by the video encoder.

* * * * *